Jan. 18, 1938.  W. C. MILLER ET AL  2,105,983
MONEY DRAWER AND LOCKER
Filed Oct. 25, 1934    9 Sheets-Sheet 3

Fig. 3.

Inventors:
William C. Miller
and Albert L. Abbott.
By Dyrenforth, Lee, Chritton & Wiles
Attys.

Jan. 18, 1938.  W. C. MILLER ET AL  2,105,983
MONEY DRAWER AND LOCKER
Filed Oct. 25, 1934   9 Sheets-Sheet 5

Jan. 18, 1938.  W. C. MILLER ET AL  2,105,983
MONEY DRAWER AND LOCKER
Filed Oct. 25, 1934   9 Sheets-Sheet 8

Inventors:
William C. Miller
and Albert L. Abbott.
By Dyrenforth, Lee, Chritton & Wiles
Attys.

Patented Jan. 18, 1938

2,105,983

UNITED STATES PATENT OFFICE 2,105,983

MONEY DRAWER AND LOCKER

William C. Miller and Albert L. Abbott, Canton, Ohio, assignors to Diebold Safe & Lock Co., Canton, Ohio, a corporation of Ohio Application October 25, 1934, Serial No. 749,968

17 Claims. (Cl. 70—87)

This invention relates particularly to a combined money-drawer and locker which may be used, for example, by a bank teller.

The primary object is to provide for the safety of funds which are in charge of a teller during banking hours. In the preferred arrangement, the invention involves a drawer-locker unit comprising a drawer adapted to be automatically closed and locked and a locker into which surplus funds may be dumped from the drawer, the locks for the drawer and locker-closure being under control by a time-control lock, the latter, preferably, being on the closure of a control-cabinet. In the preferred arrangement, the control-cabinet serves to house relays and circuit-controlling means, the arrangement being such that the electric circuit system can be restored to normal condition to permit opening of the drawer and locker only by gaining access to the interior of the control-cabinet.

A main control-circuit is provided, exteriorly of the control-cabinet, with conveniently located switches, or buttons; and when this circuit is interrupted by an operative, in case of threatened hold-up, it causes an auxiliary circuit (which controls the closing of the drawer and controls the locks of the drawer and locker) to be placed in such condition as to cause the drawer to be automatically closed and locked, after which unlocking of the drawer and locker cannot be effected until restoration of the auxiliary circuit to normal condition, which can be accomplished only by access to the control-cabinet, which, in turn, cannot be opened until the lapse of a predetermined period of time.

The invention is illustrated in a preferred embodiment in the accompanying drawings, in which—

Figure 18:
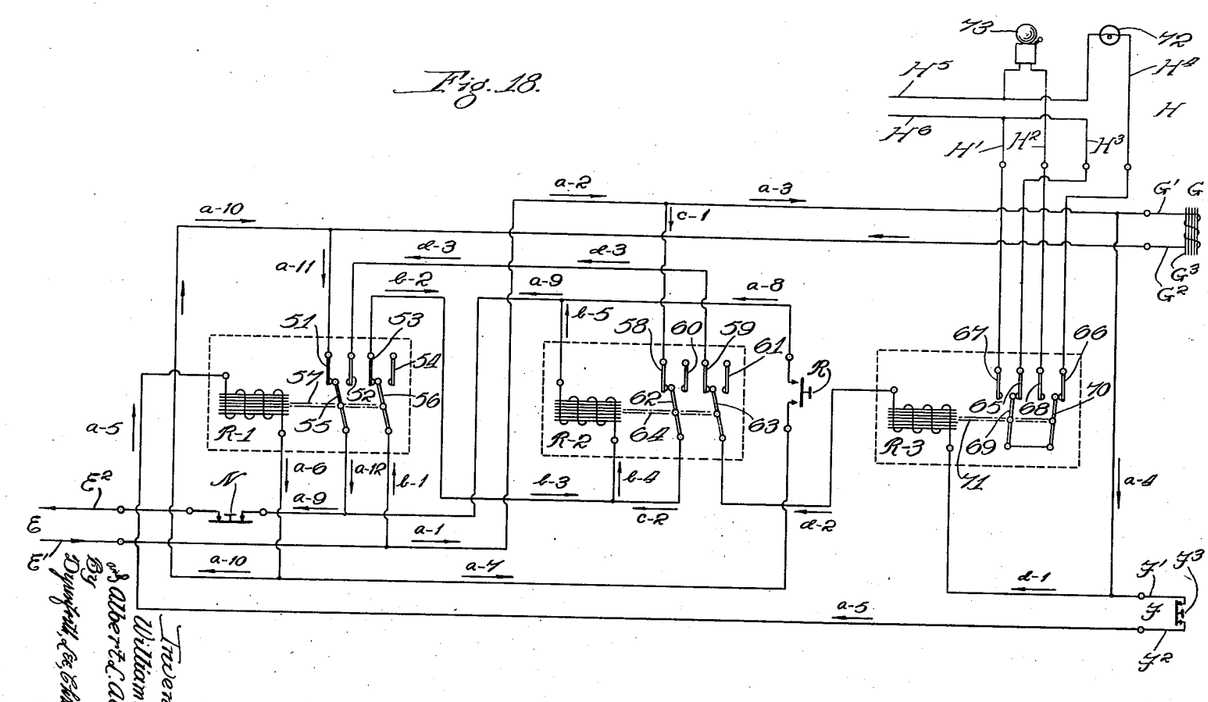
Fig. 18, a view showing diagrammatically the electric circuit system which preferably is employed.

At this point, reference is made to Fig. 18. The main control-circuit which may be equipped with any desired number of push-buttons for interrupting the circuit is shown at the lower right-hand portion of the figure; the auxiliary circuit which controls the automatic closing and locking of the drawer and which controls the locks for the drawer and locker-closure is indicated at the extreme right in the upper portion of the figure; and an alarm-circuit (shown equipped with a light and with a bell) is indicated at the upper right-hand portion of the figure. Three relays (located in the control-cabinet) are indicated in Fig. 18. The first relay and second relay are placed in the condition shown in Fig. 18 by closing a normally open re-set button. When the main control circuit shown at the lower right-hand portion of the figure is interrupted, the first relay moves to the open position, but the second relay remains closed. In the opening of the first relay, a circuit for the third relay is established, thus sounding an alarm (by extinguishing the light and ringing a bell). At night, the relays may be placed out of commission by pushing to open position a normally closed night-button. The last-mentioned button breaks the circuit which might otherwise be established for the third relay, so that no alarm is given when the night-button is temporarily opened. In the morning, restoration of the system to normal condition is accomplished by opening the control-cabinet and momentarily pressing the re-set button.

Describing the preferred embodiment illustrated in the drawings, A designates a casing of a drawer-locker unit which comprises a drawer B and a locker C; and D designates a control-cabinet provided with a lock-equipped closure D' and in which is housed a system of relays (Figs. 16–18), said relays being designated R—1, R—2 and R—3.

The drawer B is provided with a front plate designated B' which serves as a closure for the drawer-compartment in which the drawer is mounted.

Figure 1:
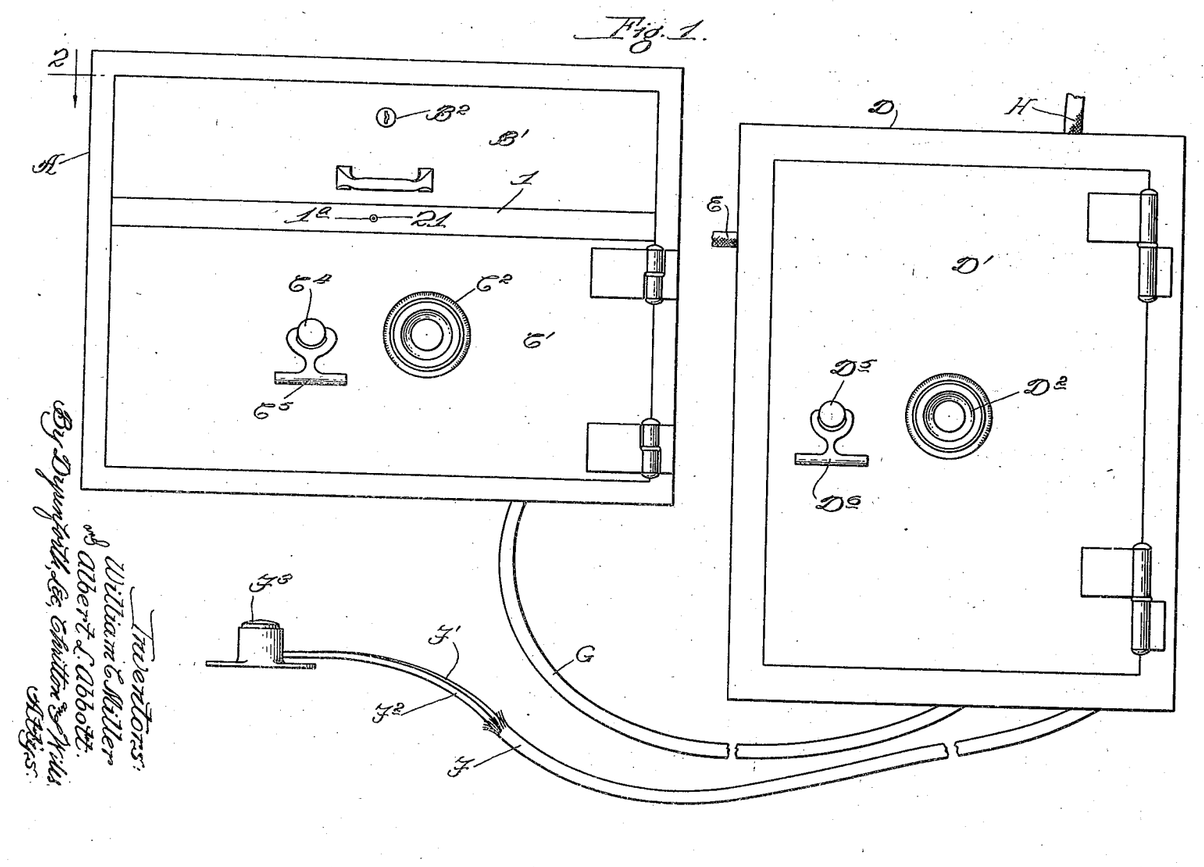
Fig. 1 is a front elevational view of the improved drawer-locker unit and the control-cabinet associated therewith.
Figures 12, 13, 14:
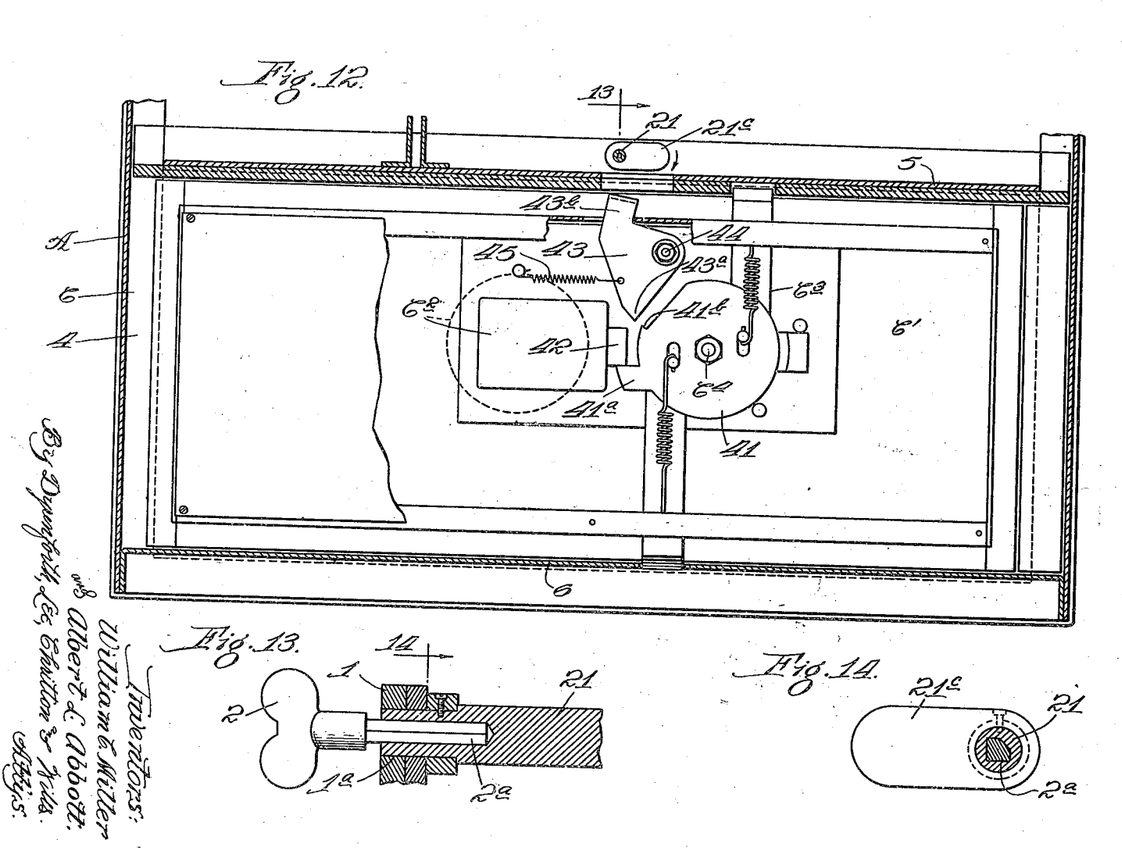
Fig. 12, a broken vertical sectional view taken as indicated at line 12 of Fig. 8, showing the locking-mechanism of the locker-closure.
Fig. 13, a broken vertical sectional view taken as indicated at line 13 of Fig. 12, this view illustrating how an angular key may be employed to rotate the ratchet-rod (against the force of its torsion-spring) to latching position, i. e., a position where it can operate to latch the drawer-closer in extended position, when the drawer-closer has been withdrawn to extended position by initially opening the drawer.
Fig. 14, a section taken as indicated at line 14 of Fig. 13, showing the rotatable ratchet-rod equipped with a member which serves to throw a locking-dog into position to prevent unlocking of the locker-door, so that neither the locker-door nor the drawer can be opened until the electric circuit system has been restored to normal condition.

As shown in Fig. 1, the casing A is equipped at its front end with a cross-member 1, having therein a perforation 1ª in which is journaled the front end of the ratchet-rod heretofore mentioned. A detail is shown in Figs. 13 and 14, it being noted that the ratchet-rod may be turned clockwise against the force of its spring, through an angle of 90° by means of a special key 2 which has an angular stem 2ª which is adapted to an angular socket with which the front end of the ratchet-rod is provided. This places the ratchet-rod in position to enable the drawer-closer to be latched in the extended position shown in Figs. 4 and 5.

The closure of the locker C is designated C'. It is shown equipped with a combination lock C² and bolt-work C³ adapted to be manipulated by a shaft C⁴ equipped with a handle C⁵ (Figs. 1 and 12).

Figure 15:
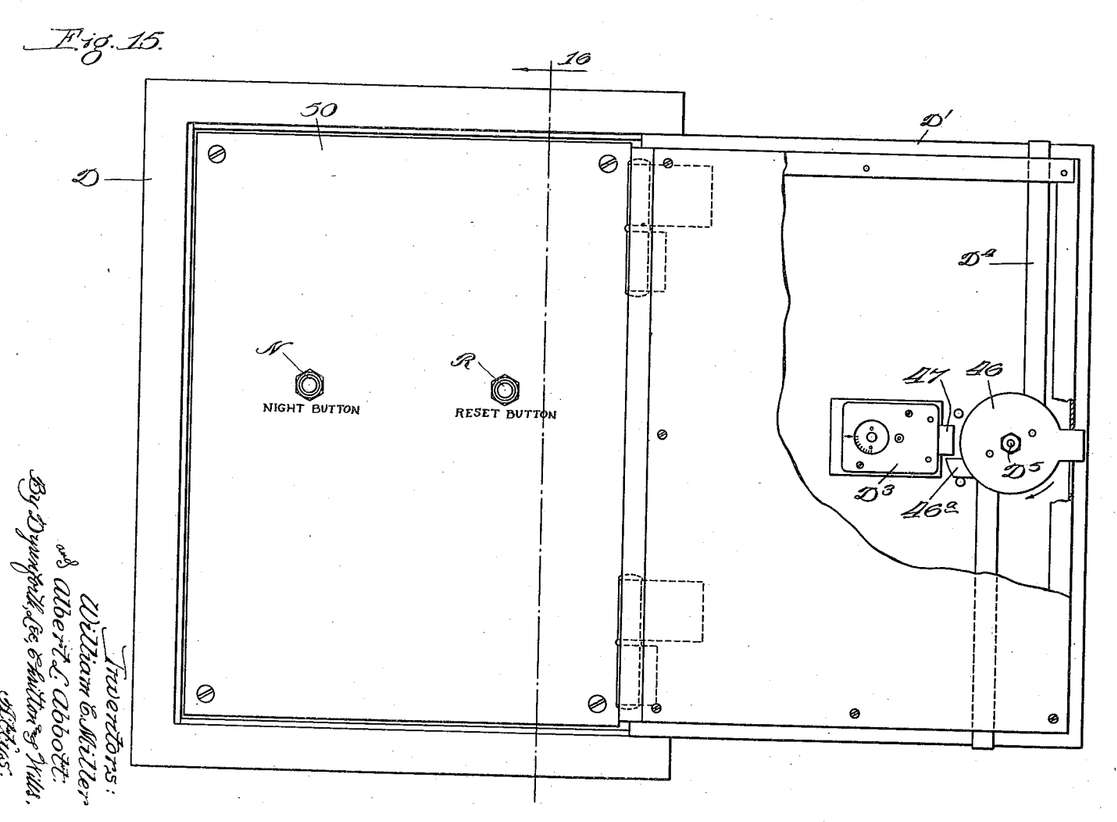
Fig. 15, a front view of the control-cabinet with the closure thereof open and one wall broken away to expose the time-control lock thereon.

The closure of the control-cabinet D' is shown equipped with a combination lock D² having time-mechanism D³ associated therewith (Figs. 1 and 15), this lock controlling bolt-work D⁴ adapted to be manipulated by a shaft D⁵ equipped with a handle D⁶.

The input for the electric system is through a cable E (Fig. 1) which comprises ingoing and outgoing electric mains E', E² respectively (Fig. 18).

The main control circuit is designated F. It comprises wires F' and F², equipped with one or more push-buttons F³ which are normally closed. These buttons may be located in strategic positions to enable one to be pushed by an employee in case of threatened hold-up.

The auxiliary electric circuit is designated G. It is shown (Fig. 1) as comprising a cable leading from the relay system in the control-cabinet to the drawer-locker unit, this circuit serving to normally energize a solenoid which restrains the drawer-closer from operating to close the drawer until such time as a button is pressed in the control-circuit F. The cable G comprises wires G' and G² (Figs. 17 and 18) through which the solenoid of the drawer-locker unit is energized.

Figure 17:
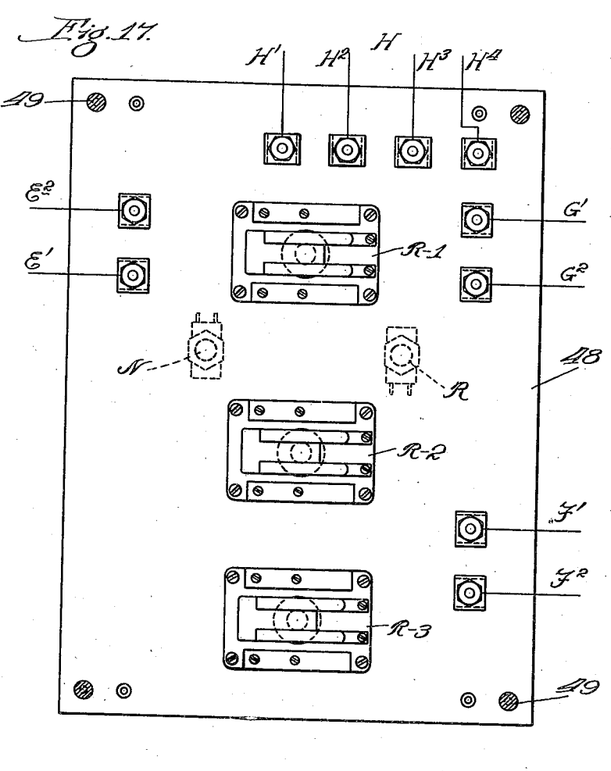
Fig. 17, a vertical sectional view taken as indicated at line 17 of Fig. 16, showing a panel in the control-cabinet equipped with a system of relays.

The alarm-circuit, as a whole, is designated H (Figs. 1, 17 and 18). It is shown as comprising wires H', H², and wires H³, H⁴, current being supplied to the alarm system through electric mains H⁵ and H⁶.

In the electric circuit system shown, a single solenoid, designated G³, is employed to maintain the mechanisms of the drawer-locker unit in condition to effect, upon the breaking of the control circuit F, automatic closing and locking of the drawer, and then maintain the drawer and locker-closure under the control of a time-lock (on the door of the control-cabinet) for a predetermined period. Thus, when the system is "sprung" by pressing a button F³ in the main control circuit, the system can only be placed again in normal operating condition by first gaining access to the control-cabinet and pressing the re-set button which controls the relay system.

The construction of the drawer-locker unit will now be described in detail.

Figure 2:
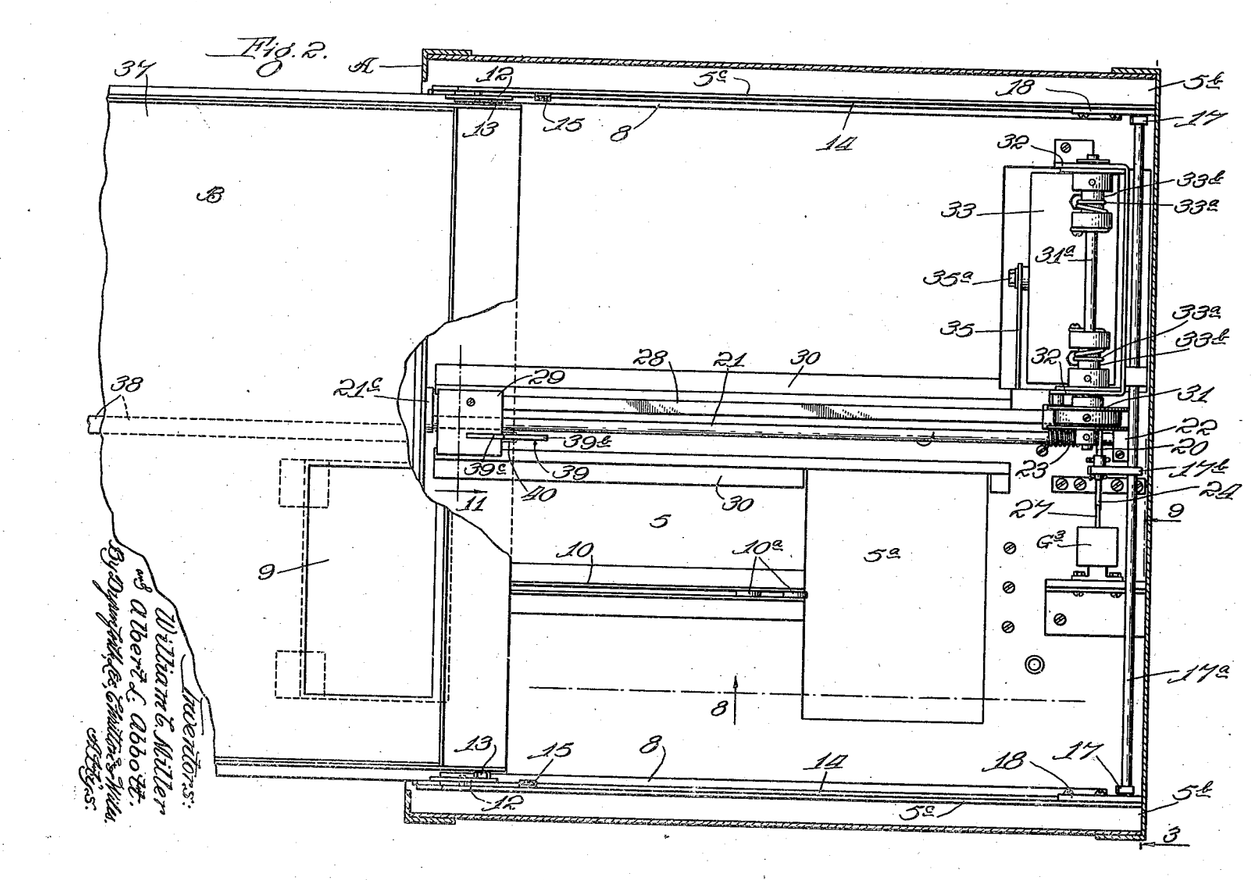
Fig. 2, a broken plan sectional view taken as indicated at line 2 of Fig. 1, the drawer being shown in open position with a rear portion of the drawer broken away.
Figure 8:
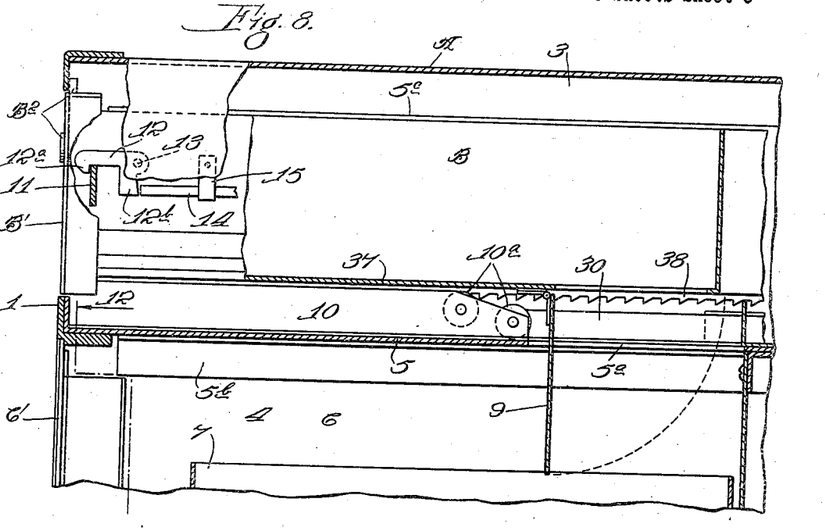
Fig. 8, a broken vertical sectional view, taken as indicated at line 8 of Fig. 2, of the drawer-locker unit, but showing the drawer in closed, locked position.

The casing A is divided into an upper drawer-compartment 3 and a lower locker-compartment 4, these compartments being separated by a horizontal wall 5 which, as shown in Figs. 2 and 8, is provided with an opening 5ª through which surplus funds may be dumped into the locker-compartment. The floor of the locker-compartment is designated 6, upon which may be supported a removable box, or open-top till, 7, (shown brokenly in Fig. 8) into which the surplus funds may be dumped.

Figure 3:
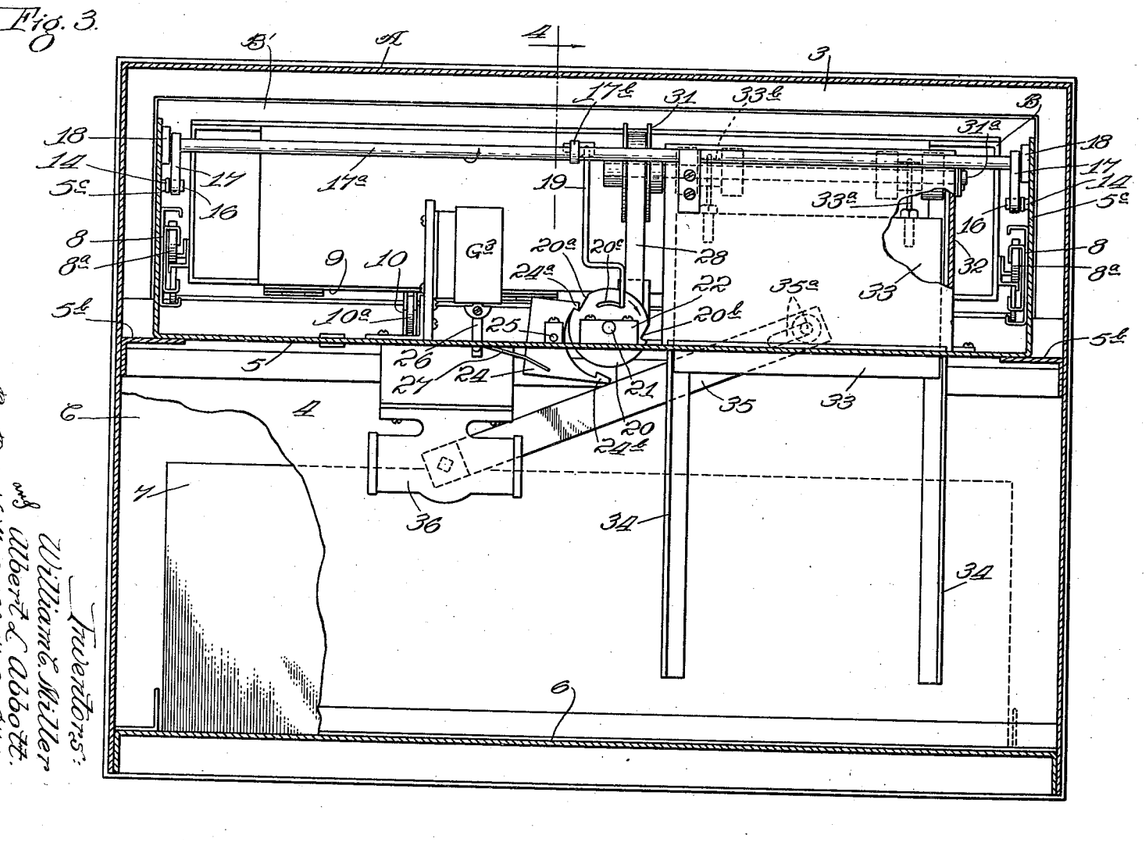
Fig. 3, a vertical sectional view, taken just inside the rear wall of the drawer-locker unit, as indicated at line 3 of Fig. 2.

As appears from Fig. 3, the horizontal wall 5 is supported on angles 5ᵇ secured to the side walls of the casing and is provided with upturned flanges 5ᶜ which support tracks 8 in which travel rollers 8ª which support the drawer B.

As will be understood from Figs. 2 and 8, the drawer B is provided near its rear end with a pivotally connected drop-section 9 which is adapted to swing downwardly through the opening 5ª when the drawer is closed. A track 10, equipped at its rear end with rollers 10ª, is adapted to effect closing of the dump-member 9 when the drawer is drawn forwardly, and the track serves further to support the member 9 in horizontal position when the drawer is fully open. The drawer-front B', as has been indicated, preferably is equipped with a suitable key-control lock, such as an ordinary reliable lock, which has been designated B². This is sufficiently indicated in Figs. 1 and 8. The drawer-front is further equipped, as shown in Fig. 8, with a transverse locking-member 11 which is adapted to be lockingly engaged by electrically controlled locking-members 12, which are mounted on pivots 13 carried by the front portions of the side-walls of the casing A. Each member 12 is in the nature of a latch-member having a forwardly extending arm equipped with a locking-lug 12$^a$ adapted to engage the bar 11 and having a short arm 12$^b$ through the medium of which the member may be released from the locking position. The arms 12$^b$ are engaged by the front ends of longitudinally movable rods 14 whose front ends are supported in guides 15 carried by the side walls of the casing A. The rear ends of the rods 14 are connected by pivots 16 with depending arms 17 fixed on the end-portions of a rock-shaft 17$^a$ whose ends are journaled in bearings 18 carried by the fixed flanges 5$^c$ which rise from the bottom of the drawer-compartment.

As will be readily understood from Figs. 3, 4, and 8 to 10, the rock-shaft 17$^a$ is equipped with an actuating arm 17$^b$ which is connected by a link 19 with a ratchet-wheel 20 which is fixedly secured on the rear end of a longitudinal, partially rotatable ratchet-rod 21, whose rear end is journaled in a bearing 22 and whose front end is journaled in the front cross-member 1 (see Fig. 13).

Figures 4, 5, 6, 7:
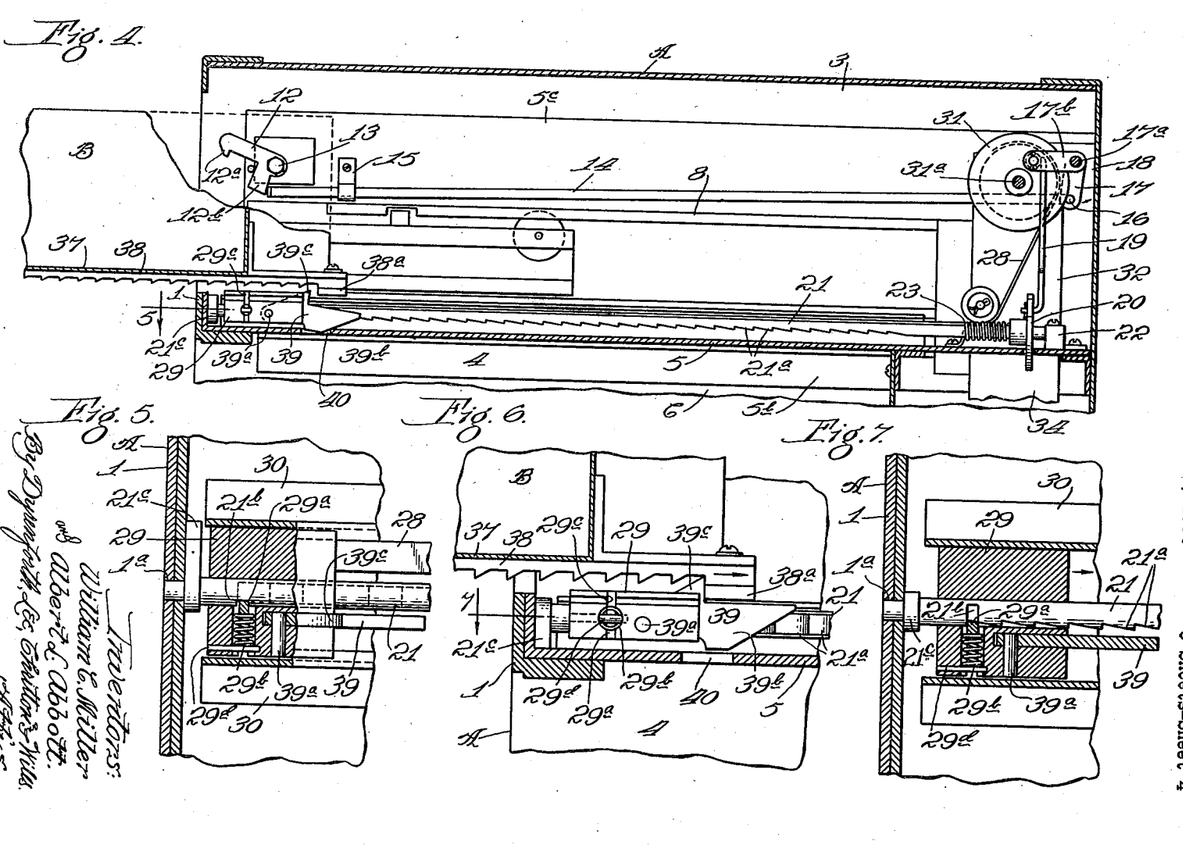
Fig. 4, a broken vertical longitudinal sectional view taken as indicated at line 4 of Fig. 3.
Fig. 5, a broken horizontal sectional view taken as indicated at line 5 of Fig. 4, the rotatable ratchet-rod being shown in plan, however.
Fig. 6, a broken sectional view showing, on a larger scale, a portion of the mechanism shown in Fig. 4, this view illustrating the drawer-closing device after it has been released from the latched position shown in Fig. 5, which is accomplished by a 90° rotation of the ratchet-rod under the action of a torsion-spring, when the circuit of an electromagnet normally holding the rod against such rotation is interrupted.
Fig. 7, a plan sectional view taken as indicated at line 7 of Fig. 6.

The ratchet-rod 21, when in the "set" position shown in Fig. 4, has its lower side equipped with ratchet-teeth 21$^a$. In this position the rod is potentially rotatable through the medium of a torsion-spring 23, which is placed under tension when the rod 21 is rotated clockwise, as viewed in Fig. 1, this action being accomplished through the medium of the key 2 (Fig. 13).

Figures 8A, 9, 10, 11:
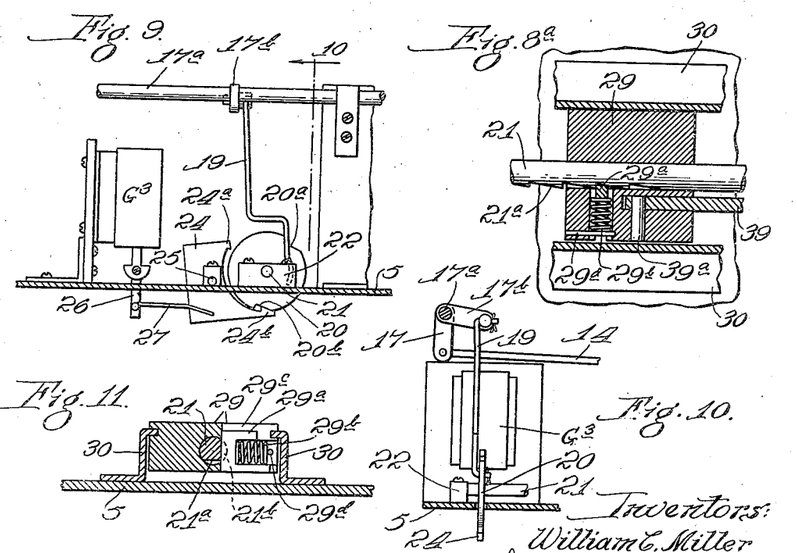
Fig. 8a, a broken sectional view illustrating how the drawer-closer serves as an additional lock (for the rear portion of the drawer) after the drawer has been automatically closed, as by interrupting the circuit of the electromagnet mentioned.
Fig. 9, a broken elevational view, corresponding with Fig. 3, but showing the position of the parts, after the electromagnet has dropped its armature, thus releasing the ratchet-rod and permitting it to rotate under the action of the torsion-spring, thus permitting the drawer-closing device to function to close the drawer, it being noted that the rock-shaft shown in the upper portion of Fig. 9 is at the same time actuated to free the lock-latches shown in Fig. 8 and permit them to drop from the position shown in Fig. 4 to the drawer-locking position.
Fig. 10, a section taken as indicated at line 10 of Fig. 9.
Fig. 11, a section taken as indicated at line 11 of Fig. 2, showing a cross-section of the drawer-closer in latched position and a cross-section of the longitudinal guides in which the drawer-closer is guided.

The rod 21 is, in the "set" condition of the apparatus, normally latched in the position shown in Fig. 4 by means of a dog, or pawl, 24, (Figs. 3, 9 and 10). The pawl 24 is supported on a pivot 25, is equipped with teeth 24$^a$ and 24$^b$, the former being adapted to engage a notch or tooth 20$^a$ and the latter being adapted to engage a tooth or notch 20$^b$ with which the ratchet-wheel 20 is provided.

The position of the dog or pawl 24 is controlled by the solenoid G$^3$, the plunger or core of which is designated 26, and which is connected, by means of a spring arm 27, with the pawl 24.

In the position shown in Fig. 3, the ratchet-rod 21 is under the tension of the spring 23 and latched in that position by the tooth 24$^a$. This is the normal condition when the apparatus is in use by the teller. In this condition, the circuit of the solenoid G$^3$ is closed. When the system is "sprung", as by pressing a button in the main control-circuit F, the solenoid G$^3$ is de-energized and permits the pawl 24 to drop to the position shown in Fig. 9. This enables the torsion-spring 23 to rotate the shaft 21 until the tooth 24$^b$ engages the notch 20$^b$. In this action, the link 19 drops the arm 17$^b$ downwardly, throws the arms 17 rearwardly, and retracts the rods 14, thus leaving the automatic locking-members 12 free to drop to the locking-position shown in Fig. 8. When the drawer B is automatically closed and locked, it cannot be opened until the control-cabinet D is opened and the electric system restored to normal condition.

As has been indicated, the ratchet-rod 21 is rotated to the position shown in Fig. 4 against the force of the spring 23, and is automatically latched in this position. As will be understood from Figs. 4 to 7 and Fig. 11, the rod 21 is provided near its front end with a latching-notch 21$^b$ which is 90° removed from the plane of the ratchet-teeth 21$^a$, the notch 21$^b$ being adapted to engage a catch with which the extensible drawer-closer is equipped.

The drawer-closing mechanism comprises an extensible strap 28 to which is attached a drawer-actuator 29 which is movable in longitudinal guides 30 supported on the floor 5 of the drawer-compartment; a catch, or dog, 29$^a$, pressed by a spring 29$^b$, and serving to latch the drawer-closer 29 in the position shown in Figs. 4, 5 and 11; a spool, or drum, 31, fixedly mounted on a transverse shaft 31$^a$, journaled in fixed standards 32 (Figs. 2 and 3); a weight 33, movable in vertical guides 34, the upper edge of the weight being connected by cords or wires 33$^a$ with drums 33$^b$ on the shaft 31$^a$; and a drawer-retarding device comprising an arm 35 having pin and slot connection with the weight at 35$^a$, the other end of the arm being connected with a door-check, or the like, as indicated at 36.

When the solenoid G$^3$ is de-energized, the rod 21 turns to the position shown in Figs. 6, 7 and 9, thus releasing the catch 29$^a$ from engagement with the notch 21$^b$, the catch then serving to engage the ratchet-teeth 21$^a$, as shown in Fig. 7.

The bottom of the drawer B is designed 37. It is equipped with a fixedly secured longitudinally extending ratchet-bar 38. This bar extends the length of the drawer and may project somewhat beyond the rear end of the drawer. At the rear end of the ratchet-bar 38 is a stop or shoulder 38$^a$.

The block 29 which serves as a drawer-actuator is equipped with a pawl 39 which is connected with the block by a pivot 39$^a$. This pawl has a tongue-portion 39$^b$ which is adapted to ride on the bottom wall 5 of the drawer-compartment and to drop into a recess 40 in said bottom wall when the member 29 is in the extended position shown in Fig. 4. The pawl 39 is provided with a tooth 39$^c$ which is adapted to engage either the shoulder 38$^a$, or any one of the teeth of the ratchet-bar 38. When the drawer is initially withdrawn to the open position, the shoulder 38$^a$ engages the tooth 39$^c$ and moves the drawer-closer to the latched position shown in Fig. 4. In this position, the notch 40 permits the pawl 39 to drop sufficiently to clear the teeth of the ratchet-bar 38, but the pawl is still in position to engage the shoulder 38$^a$ when the solenoid G$^3$ is de-energized. However, should the drawer be partially closed when the system is "sprung", the pawl will engage a ratchet-tooth of the pawl 38 and cause the drawer to be moved to the fully closed position. When the drawer is in the fully closed position, it is locked by the automatic locking-members 12. It is further locked through the medium of the drawer-closer which, on the one hand, engages the ratchet-bar 38 and on the other hand engages the ratchet-rod 21, the latter being now held by the pawl 24 in the angular position shown in Fig. 9.

It may be noted that the latch-member 29$^a$ is a flat member slidable in a slot 29$^c$ in the block 29; and the block 29 is provided with a bore which receives the spring 29$^b$, the spring being held in position by a pin 29$^d$. The slidable flat catch-member 29$^a$ is slotted to accommodate the spring and above this slot the metal is cut away (see Fig. 11) to prevent the catch from striking the flange of the guide-member 30.

It may be noted also that the lower end of the link 19 is turned forwardly and engages an arcuate slot 20$^c$ in the disk 20, as will be understood from Figs. 3, 9 and 10. The function of the link 19 is simply to actuate the rockshaft 17$^a$ which controls the automatic drawer-locking members 12.

Referring to Figs. 1, 8 and 12, the locker-door C' preferably is equipped with a combination lock, as stated above. In the illustration given, the bolt-work C$^3$ is actuated independently of the combination lock after the latter has been manipulated to unlock the bolt-work. It is well understood in the art, however, that a combination-lock may be employed which serves directly to lock the door-jamb. In the illustration given (see Fig. 12) the shaft or stem C$^4$ is equipped with a disk 41 which is provided with a locking-shoulder 41$^a$ adapted to be engaged by the bolt 42 of the combination-lock. The disk 41 is further provided with a shoulder 41$^b$ which is adapted to be engaged by an electrically controlled locking-member 43, shown in the form of a member supported on a pivot 44 and having a locking-tooth 43$^a$ and an actuating arm 43$^b$. A spring 45 holds the member 43 in the position shown in Fig. 12 until the system is "sprung" as by pushing a button in the main control-circuit F. When this occurs, the ratchet-rod 21 is automatically turned in the direction indicated by the arrow in Fig. 12. The rod is equipped near its front end with an arm 21$^c$ which, when the system is "sprung", moves from the horizontal position shown in Fig. 12, strikes the arm 43$^b$, and then holds the locking-member 43 in locking engagement with the shoulder 41$^b$ of the disk 41, so that it is impossible to unlock the locker-closure until the electric system is restored to normal condition. Thus, the locker-closure as well as the money-drawer is under the protection of a time-control lock (on the control-cabinet).

The main parts of the control-cabinet D have already been mentioned. The closure D' should be under the control of a time-lock. In the illustration given, the bolt-work D$^4$ is actuated by the handle D$^6$, the stem or shaft D$^5$, and a disk 46 secured to the shaft D$^5$. The disk is equipped with a locking-shoulder 46$^a$ controlled by the locking-bolt 47 of the time-control lock D$^3$. Until the bolt 47 is withdrawn, the closure D' cannot be opened. Any suitable time-control mechanism may be employed in connection, for example, with a combination lock. For example, time-control mechanism may be associated with a combination lock in the manner described in Miller & Kuenzel application 613,954, filed May 27, 1932. Instead of providing separate means for actuating the bolt-work, the bolt of the combination-lock may itself serve to directly lock the door in closed position, as in the illustration given in the application just mentioned.

It may be added that the time-control mechanism of the nature shown in the application mentioned may be adjusted to make it necessary for a predetermined period of time to elapse before the door can be opened. It is common, for example, to provide for a period of 15 minutes to 30 minutes.

Figure 16:
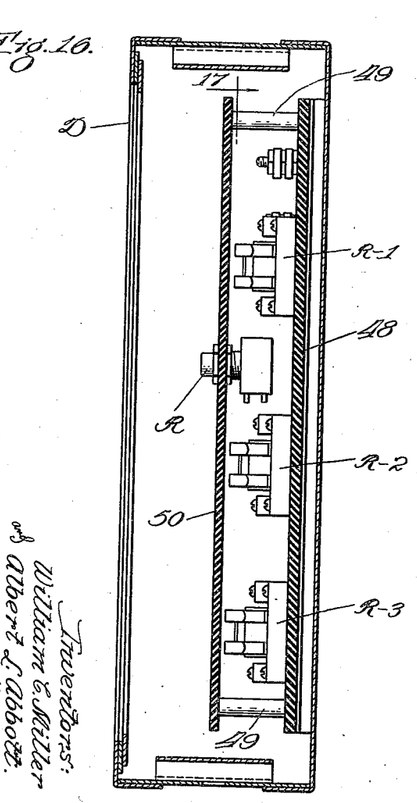
Fig. 16, a vertical sectional view of the control-cabinet, with the closure thereof removed.

Referring to Figs. 16–18, the relays R—1, R—2 and R—3 are shown mounted on a panel 48 which is secured to the back wall of the control-cabinet D. Supported on this panel, and spaced therefrom as by means of studs 49, is a front panel 50 upon which are mounted a normally closed night-switch button, designated N, and a normally open re-set switch-button, designated R. The manner in which these buttons are used in the electric circuit system is shown diagrammatically in Fig. 18. It will be noted that the night-switch N is located in one of the electric mains, so that when the button is pushed it operates to throw the entire relay system out of use. The re-set switch-button R normally is open. By momentarily closing it in the morning, the electric system is restored to normal condition, the relay R—1 and R—2 being energized.

In relay R—1, the fixed switch-points are designated 51, 52 and 53, and a stop-point is designated 54. The corresponding movable switch-points are designated 55 and 56, these movable members being connected with the armature 57.

In relay R—2, the fixed switch-points are designated 58 and 59, and dead stop-points are designated 60 and 61. The movable switch-points are designated 62 and 63, these points being connected with the armature 64.

In relay R—3, the fixed switch-points of one pair are designated 65 and 66; and the fixed switch-points of another pair are designated 67 and 68. The coacting movable switch-points are designated 69 and 70. They are actuated by the armature 71.

To place the apparatus in condition for the day's use, an operator opens the control-cabinet D, which can be accomplished only after the time-lock has run a predetermined period of time following the setting of the tumblers of the combination lock in position to permit unlocking. When access is gained to the interior of the control-cabinet, the operator presses the re-set button R, thus closing the circuit at this point. This places the relays in the condition shown in Fig. 18, in which condition the solenoid G$^3$ of the drawer-locker unit is energized. The teller is free to unlock the drawer B, so far as the lock B$^2$ is concerned, at any time. In the morning, after the electric system has been restored to normal condition, the teller inserts the key 2 into the socket of the ratchet-rod 21 and turns the ratchet-rod 90° against the tension of the spring 23, whereupon the ratchet-rod becomes locked in that position by means of the pawl 24 controlled by the solenoid G$^3$ (Fig. 3). The action of turning the rod 21 to the position shown in Figs. 3 and 4 has the effect of releasing the automatic locks 12 which engage the cross-bar 11 at the front end of the drawer.

Accordingly, the teller is free to draw the drawer to the open position. In doing so, the drawer-closer 29 is drawn to the extended position and becomes latched in the extended position, as shown in Fig. 5. The drawer can now be closed and opened at will. Should a button F$^3$ be pushed in the main control circuit F, thus breaking that circuit, the result is to de-energize the solenoid G$^3$, sound an alarm in the circuit H, cause the drawer to be automatically closed and locked, and cause the drawer and the door of the locker to be kept under the control of the time-lock on the control-cabinet B.

The closing of the re-set button R (Fig. 18) permits current to pass from the electric main E' via the arrows indicated $a$—1 to $a$—4, thence through the main control-circuit F, thence via the arrows marked $a$—5 to $a$—9, and thence out through the main electric main E$^2$. Thus, relay R—1 is energized and the switches 55 and 56 thrown to the position shown in Fig. 18. In this condition, a second circuit is established from the main E' via the arrows marked $b$—1 to $b$—5 and thence via the arrow $a$—9 and out through the electric main E$^2$. Thus, the relay R—2 is energized. Before the re-set button R is released, a second circuit is established via the arrow $a$—6 and the arrows a—10 to a—12, and thence via the arrow a—9 to the main E². Thus, the relay R—1 continues to be energized, even though the re-set button R is released to break the circuit between the arrows a—7 and a—8. Also, a second circuit is completed through the relay R—2 from the main E' via the arrows a—1, a—2, thence via the arrows c—1, c—2, b—4, b—5, and a—9 to the main E². Thus, the relay R—1 may drop its armature without causing the relay R—2 to drop its armature. In the condition shown in Fig. 18. a circuit is established through the relay R—3 only when relay R—1 drops its armature, thus bringing the switch 55 against the contact 52. A circuit is then completed from the line marked with the arrow a—4 via the arrows d—2 to d—3, thence through switch 55, thence via arrow a—12 and arrow a—9 to the main E². Thus, it appears that when the main control-circuit F is broken, the solenoid G³ will be de-energized, the circuit of relay R—3 will be completed, and the switches 69 and 70 will be moved to break the circuit of the lamp 72 and close the circuit of the alarm-bell 73. Thus, the extinguishing of the lamp and the ringing of the bell serve as an alarm. On the other hand, when the night-switch N is pressed to open the circuit in one of the electric mains, the relays are thrown out of commission, and the alarm-circuit is not completed.

Any suitable electric circuit system may be employed in lieu of the one illustrated. It is advantageous, however, to have the drawer-locker unit controlled by a single electromagnet (G³) and to have the means for restoring the electric circuit to normal condition securely housed in a control-cabinet which is under the control of a time-lock. Such control-cabinet may be located in a position where it cannot readily be found by hold-up men; and even should they find it, it will be impossible for them to compel an attendant to restore the electric system to normal condition until after a predetermined period of time shall have elapsed. Knowing that an alarm undoubtedly has been given, robbers are unlikely to wait the necessary length of time to gain access to the control-cabinet.

The foregoing detailed description has been given for clearness of understanding only, and no unnecessary limitations should be understood therefrom, but the appended claims should be construed as broadly as permissible, in view of the prior art.

What we claim as new and desire to secure by Letters Patent is:

1. In combination: a control-cabinet provided with a closure; a time-control lock for said closure; a drawer and locker unit comprising a locker provided with a lock-equipped closure and a drawer equipped with drawer-closing and locking means; an electric circuit system controlling the closing and locking of said drawer and the unlocking of the drawer and the locker-closure, said electric system including means outside said control-cabinet for initiating the closing and locking of said drawer and including also a relay system housed in said control-cabinet having a reset switch operable only after gaining access to the interior of said control-cabinet, and means within said control cabinet for throwing said relay system out of commission.

2. In combination: a drawer; an extensible drawer-closer which is rendered potential by initially opening said drawer; and a latch-device for holding the drawer-closer under restraint, comprising a partially rotatable latch-rod, actuating means rendered potentially operative by turning said rod in one direction, an electrically controlled lock for said latch-rod, and a catch-device between said drawer-closer and said latch-rod adapted to release the drawer-closer when said latch-rod is released from its electrically controlled lock.

3. In combination: a drawer; an extensible drawer-closer adapted to be rendered potentially operative by the initial opening of the drawer and thereafter permitting the drawer to be manipulated; a latch-rod equipped with a torsion-spring and equipped at one side near its front end with a latching-shoulder and equipped at another side throughout its length with ratchet-teeth, a latch-member carried by said drawer-closer adapted to engage said latching-shoulder when the rod is in one position and adapted to engage said ratchet-teeth when the rod is in another position; and an electric controlling device normally holding said latch-rod in the position wherein said spring is under tension.

4. A structure as specified in claim 3, in which said drawer is equipped with a longitudinal ratchet-bar and said drawer-closer is equipped with a pawl coacting with said ratchet-bar.

5. A structure as specified in claim 3 in which said drawer is equipped with a longitudinally disposed ratchet-bar and is equipped near the rear end of said ratchet-bar with a shoulder disposed at a lower level, and in which said drawer-closer is equipped with a pawl which is adapted to coact with either said shoulder or with the teeth of said ratchet-bar.

6. In combination: a casing; a drawer withdrawable from said casing equipped near its rear end with a shoulder and equipped along its bottom with a ratchet-bar; an extensible drawer-closer rendered potentially operative in the initial opening of said drawer; means for latching said drawer-closer in extended position; means carried by said drawer-closer adapted to coact with either said shoulder or with the teeth of said ratchet-bar to effect closing of the drawer; and remote-control means controlling the release of said drawer-closer.

7. In combination: a casing; a drawer withdrawably mounted in said casing; an extensible drawer-closer rendered potentially operative in the initial operation of withdrawing said drawer; means for latching said drawer-closer in extended position; a ratchet-device carried by said drawer; a pawl carried by said drawer-closer; coacting means for causing said pawl to engage said ratchet-device when said drawer-closer is released from restraint; and remote control means controlling the release of said drawer-closer.

8. A structure as specified in claim 7, in which the means for causing said pawl to engage said ratchet-device is a wall disposed below the path of said drawer, said wall having a recess which permits said pawl to drop when the drawer-closer is in the extended position.

9. In combination: a casing; a drawer withdrawably mounted in said casing; an extensible drawer-closer rendered potentially operative by initially opening said drawer and then permitting manipulation of the drawer; a latch-device for holding said drawer-closer in the extended position; drawer-locking means carried by the front portion of said casing and adapted to lockingly engage the front portion of said drawer when it is closed; and an electric control device controlling the release of said drawer closer and the movement of said drawer-locking device.

10. In combination: a casing; a drawer withdrawably mounted in said casing; an extensible drawer-closer rendered potentially operative by initially withdrawing said drawer; means for latching said drawer-closer in extended position; a ratchet-bar carried by said drawer; a ratchet-rod mounted in said casing; means on said drawer-closer coacting with said ratchet-bar and ratchet-rod to prevent opening of the drawer after it has started to close; and remote control means controlling the release of said drawer-closer.

11. A structure as specified in claim 10, in which said ratchet-rod is partially rotatable and is equipped with a shoulder which coacts with said means for latching said drawer-closer in extended position.

12. In combination: a casing; a drawer withdrawably mounted therein; a locking-member mounted in the front portion of the casing and coacting with a locking member on the front portion of the drawer; an extensible drawer-closer rendered potentially operative in the initial opening of said drawer; ratchet-means for preventing forward movement of said drawer-closer after the closing movement has started; and remote control means controlling the movement of said locking-member to locking-position and controlling the operation of said drawer-closer.

13. A structure as specified in claim 12, embodying a partially rotatable spring-actuated rod controlling the operative movement of said drawer-closer and controlling the movement of said locking-member.

14. In combination: a casing; a drawer withdrawably mounted therein; an extensible drawer-closer rendered potentially operative by the initial withdrawal of said drawer; means for latching said drawer-closer in extended position, including a rotatable latch-rod; means for locking said drawer in closed position controlled by said rotatable latch-rod; and an electrically controlled latch controlling the operation of said latch-rod.

15. In combination: a casing; a drawer withdrawably mounted therein; an extensible drawer-closer rendered potentially operative by the initial opening of said drawer; means for latching said drawer-closer in extended position; a drum with which said extensible drawer-closer is connected; a vertically movable weight in the rear portion of said casing for actuating said drum; and an electrical control device controlling the release of said drawer-closer.

16. A structure as specified in claim 15, in combination with means for retarding the descent of said weight.

17. In combination: a drawer; an extensible drawer-closer rendered potentially operative in the initial opening of the drawer; a partially rotatable key-controlled latch-rod; a spring adapted to actuate said latch-rod in one direction, said latch-rod being equipped with ratchet teeth and the drawer-closer being equipped with a catch-device adapted to become latched to said rod when the rod is in one position and adapted to engage said ratchet-teeth when the rod is in another position.

WILLIAM C. MILLER.
ALBERT L. ABBOTT.